United States Patent [19]

Minjolle et al.

[11] Patent Number: 4,853,053

[45] Date of Patent: Aug. 1, 1989

[54] METHOD OF WELDING TWO HALVES OF A HOLLOW CERAMIC COMPONENT

[75] Inventors: Louis Minjolle, Tarbes; Michel Drouet, Juillan; Jean-Louis Fatta-Barou, Bazet; Michel Callegari; Jacques Noël, both of Tarbes, all of France

[73] Assignee: Societe Anonyme Dite: Ceraver, Paris, France

[21] Appl. No.: 129,352

[22] Filed: Nov. 30, 1987

Related U.S. Application Data

[63] Continuation of Ser. No. 912,209, Sep. 25, 1986, abandoned, which is a continuation of Ser. No. 673,449, Nov. 21, 1984, abandoned.

[30] Foreign Application Priority Data

Nov. 21, 1983 [FR] France .................................. 83 18483

[51] Int. Cl.⁴ ............................................. B32B 31/00
[52] U.S. Cl. ............................... 156/73.5; 156/73.6; 156/89; 156/228; 156/580; 264/68; 264/69
[58] Field of Search .................. 156/73.5, 73.6, 89, 156/228, 292, 304.1, 304.2, 304.6, 580; 264/68, 69

[56] References Cited

U.S. PATENT DOCUMENTS

| | | | |
|---|---|---|---|
| 3,026,229 | 3/1962 | Wilcox | 156/306.6 |
| 3,062,695 | 11/1962 | Hull | 156/73.5 |
| 3,405,203 | 10/1968 | Derror | 264/69 |
| 4,017,347 | 4/1977 | Cleveland | 156/210 |
| 4,061,515 | 12/1977 | Willem | 264/69 |
| 4,082,906 | 4/1978 | Amin et al. | 156/89 |
| 4,265,689 | 5/1981 | Jeffrey | 156/304.2 |
| 4,364,783 | 12/1982 | Theodore et al. | 156/89 |

Primary Examiner—Jay H. Woo
Assistant Examiner—Timothy W. Heitbrink
Attorney, Agent, or Firm—Burns, Doane, Swecker & Mathis

[57] ABSTRACT

Method of welding two hollow ceramic half-components containing an organic binder whereby each half-component is first loaded into a die, the jointing planes of the two half-components are then brought into contact by bringing together the two dies, working pressure is thereafter applied to one of the half-components in a direction perpendicular to the jointing planes and vibration is simultaneously applied to the other half-component in a direction parallel to the jointing planes to effect the welding of the two half-components by interpenetration. The two dies are then separated and the joined monobloc component is removed and sintered without altering the component's monolithic quality.

3 Claims, 2 Drawing Sheets

METHOD OF WELDING TWO HALVES OF A HOLLOW CERAMIC COMPONENT

This application is a continuation of application Ser. No. 912,209, filed Sept. 25, 1986, now abandoned, which in turn is a continuation of application Ser. No. 673,449, filed Nov. 21, 1984, now abandoned.

BACKGROUND OF THE INVENTION

This invention concerns a method of welding two halves of a hollow ceramic component before sintering, yielding a tight-toleranced monobloc part which remains monolithic even after sintering.

It also concerns a welding machine serving to implement said method.

There are several known methods of welding or bonding together hollow ceramic component halves. However, none of these methods are entirely satisfactory for obtaining very close tolerance monobloc components.

The known method known as "mirror" bonding, which consists in applying each component half to a face of a heating plate, does not provide a true weld in the sense that the parts are merely stuck together when the plastic binders contained in the ceramic material migrate toward the surface of the joining plane as each half-component is applied to the "mirror" and then bonded plastic-to-plastic as the parts are joined. This weld is destroyed when the weld slag is chipped off.

The method of welding with a solvent, whether in pure or slipped form, yields mediocre results, for the weld has many defects after sintering. Moreover, the use of solvents requires a number of safety precautions.

Ultrasonic welding provides a good weld of the two half-components, but nevertheless has three major drawbacks, namely:
  it does not allow more than one component to be welded per machine and per cycle;
  welding time is very long, lasting about 20 seconds;
  and a new sonotrode must be fabricated every time there is a change in part geometry.

SUMMARY OF THE INVENTION

The present invention is directed to providing a fast welding method, not involving strict safety requirements, yet providing outstanding welds and affording a high dimensional reproducibility for each monobloc component produced by joining two half-components. In addition, the parts or components obtained remain monobloc after sintering.

The method according to the invention involves the following steps:
loading each half-hollow-component into a die,
bringing into contact the jointing planes of the two half-components by bringing together the two dies,
applying a pressure to one of the half-components in a direction perpendicular to the jointing planes, and simultaneously applying a vibration to the second half-component in a direction parallel to the jointing planes, to effect the welding of the two half-components by interpenetration,
pulling apart the two dies,
removing the monobloc component now obtained and submitting it to the standard ceramics thermal processing procedures, such as sintering it without altering the components monolithic quality.

The method preferably further involves at least one of the following procedures:
adjusting the welding time to obtain a specified depth of interpenetration,
accurately positioning the second half-component in relation to the first to obtain a monobloc component with precise dimensions
and waiting for the joined monobloc component to cool before removing the working pressure.

The welding machine according to the invention features two working assemblies connected by a frame, one of said working assemblies moving vertically and comprising an upper die containing a pattern cavity for holding the component half termed the top half, and the other of said assemblies moving horizontally and comprising a lower die containing a pattern cavity for holding the component half termed the bottom half, said vertically moving assembly enabling the two half-components to be loaded into the pattern cavities, enabling the jointing planes of said two parts to be brought into contact, and application of the working pressure on the top half, and said horizontally moving assembly enabling vibrations to be applied to the bottom half.

The machine preferably further includes at least one of the following features:
the vertically moving assembly is driven by a cylinder,
the horizontally moving assembly comprises a shake table driven by a vibration device,
the shake table is spring-loaded on a centering device.

BRIEF DESCRIPTION OF THE DRAWINGS

Following is a description, by way of example and with reference to the accompanying drawings, of a welding method and machine according to the invention.

FIG. 1 shows an upper die 21 connected to a rod 23 and containing a pattern cavity 22, and a lower die 31 containing a pattern cavity 32. These two pattern cavities 22, 32 are obtained by pouring molten materials onto a pattern, said materials being for example araldite or polyurethane.

Figure 1:
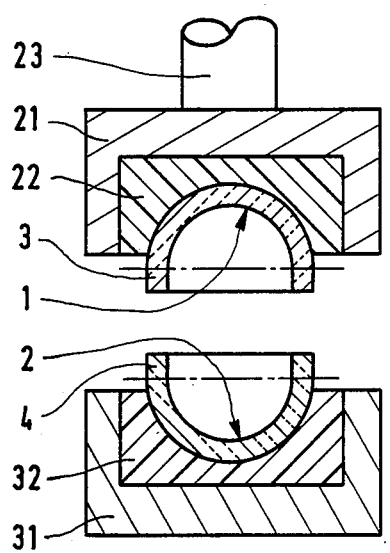
FIGS. 1 to 4 illustrate the main steps of the method according to the invention.

Two hollow ceramic parts 1, 2 are placed in the pattern cavities 22 and 32 respectively, the first part 1 having a projecting part 3 and the second 2, a projecting part 4.

Figure 2:
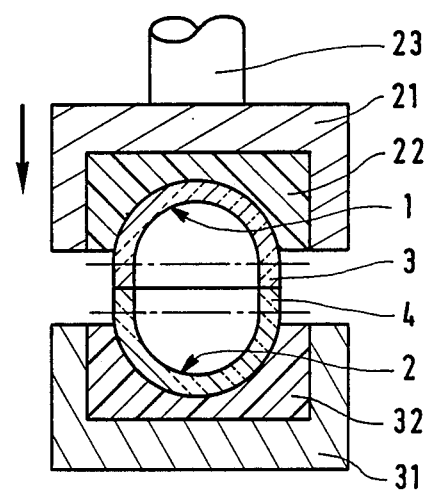

FIG. 2 shows the two parts 1, 2 having been brought into contact with one another.

Figure 3:
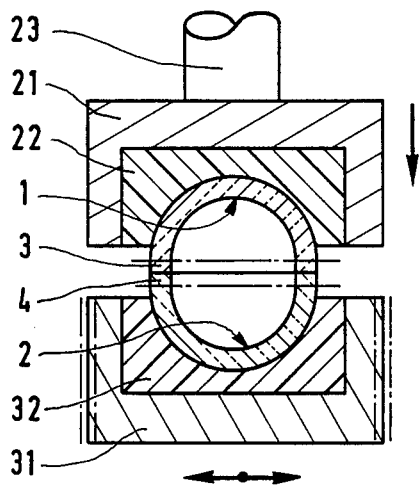

FIG. 3 illustrates the welding phase proper, during which working pressure is applied vertically to the upper die 21 as the lower die 31 is vibrated to effect a weld by interpenetration of the projecting parts 3, 4.

Figure 4:
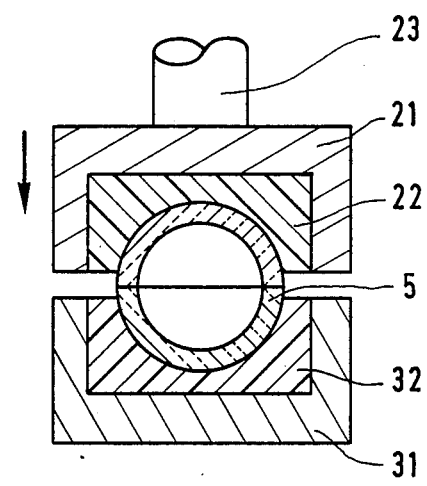

FIG. 4 shows the two parts or half-components 1, 2 as welded. The projecting parts of working allowances 3, 4 have disappeared, leaving a monobloc component 5 with precise dimensions.

DESCRIPTION OF THE PREFERRED EMBODIMENT

Figure 5:
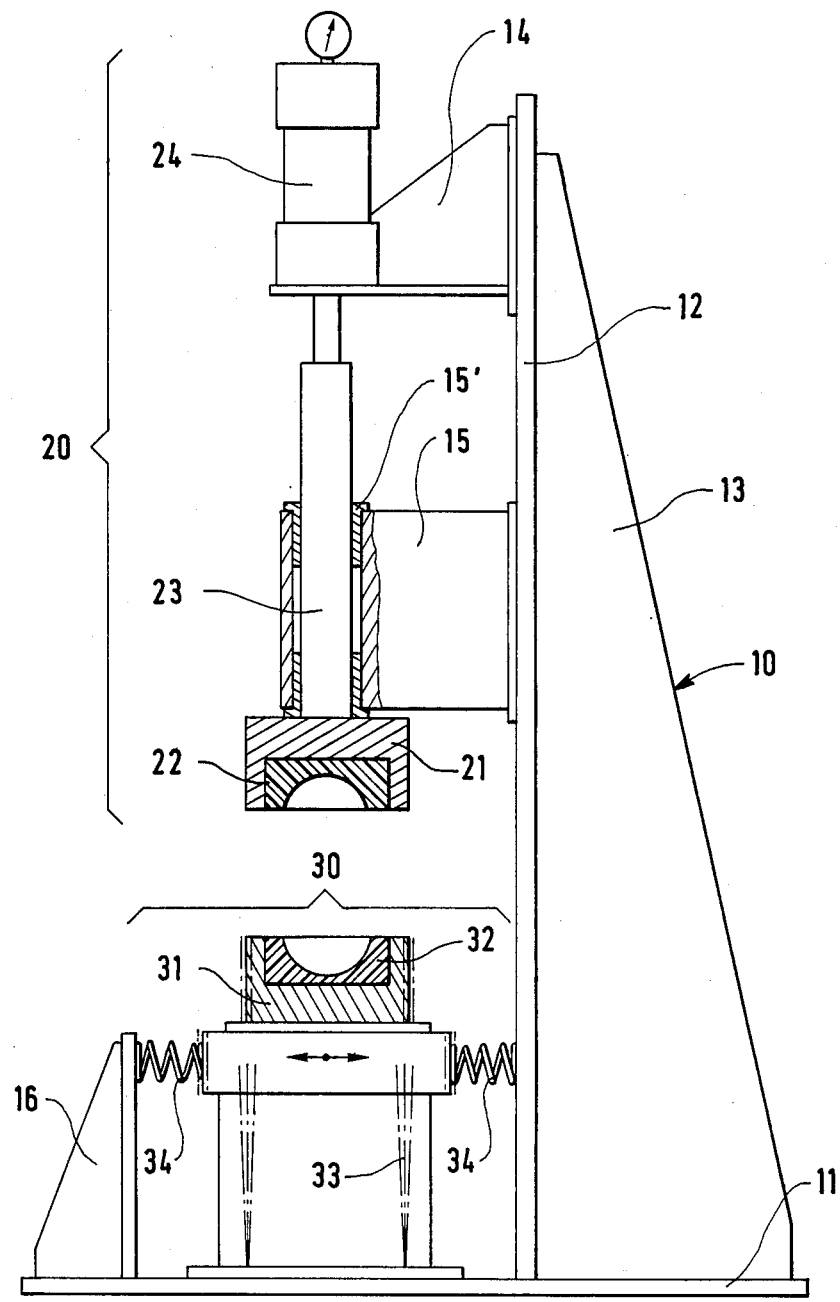
FIG. 5 is a schematic drawing of the machine according to the invention.

The welding machine according to the invention, illustrated in FIG. 5, consists of a frame 10 made up of a horizontal support 11 and a vertical support 12 joined by a vertical rib 13.

Said horizontal support 11 supports a horizontally movable working assembly 30, which includes a shake table 33 and, attached thereto, the lower die 31. The shake table 33 is spring-loaded in a two-spring centering device 34, the springs whereof are attached on two sides of the table, and connected respectively to a fixed bracket 16 on the horizontal support 11 and to the vertical support 12, the centering action consisting in aligning the vertical axis of die 31 with the vertical axis of die 21.

The shake table can be quickly connected to or disconnected from any suitable vibratory drive (not shown).

Vertical support 12 comprises two stationary brackets 14, 15 together supporting a vertically moving working assembly 20. Specifically, bracket 14 holds cylinder 24 and bracket 15 carries a guiding bush 15' in which slides a vertical ram rod 23 one end of which is connected to the cylinderand the other end of which is connected to the upper die 21.

The machine's welding cycle runs as follows:

Beginning with die 21 in raised position, the two half-components 1, 2 are loaded into their respective dies (FIG. 1). The jointing planes of the two half-components are then brought into contact by the thrust of cylinder 24 (FIG. 2). The actual welding operation is effected by applying working pressure, generally in the 0.5 to 20 bar/cm² range, to the top half-component 1 and, as soon as the desired pressure is reached, quickly connecting the shake table to the vibratory drive, transmitting the vibrations to the bottom half-component 2, whilst the top half remains fixed (FIG. 3).

At this stage, the depth of penetration can be adjusted by two different approaches:
either by controlling the vibration time between 0.05 and 3 seconds by means of an electronic timer,
or by controlling the actual depth of penetration between the parts by means of an electronic depth gage (depth can vary from 0.3 to 3 mm).

On timing out or bottoming out, the shaker table is disconnected from the vibratory drive and the spring-loaded centering device aligns the two half-components (FIG. 4). Such alignment can be made with an accuracy of up to ±0.05 mm, for example.

The vibratory drive must be disconnected very quickly to avoid a transitional phase of decreasing vibration. To avoid excessive flash at the weld, ceramics materials containing paraffinic waxes should preferably be used.

After allowing the joined monobloc component 5 to cool for a time of, for example 0.05 to 2 seconds, the vertical working assembly 20 is raised and the component 5 removed from the dies.

This welding method can be used with all ceramic materials such as alumina, zirconia, mullite, cordierite, silicon carbide, silicone nitride, sialon, or others. All of these materials are satisfactorily welded by this method and their subsequent sintering neither destroys nor damages the weld.

We claim:

1. A method for welding two halves of a hollow ceramic component together, each half having a jointing plane, said method comprising the steps of:
    loading first and second hollow ceramic half-components, respectively, into two dies with the die for the second component being integral with a vibrating table, each of said first and second ceramic half-components containing an organic binder and having monolithic characteristics,
    bringing together the jointing planes of the two half-components into contact with one another by bringing together the two dies,
    applying working pressure on the first half-component perpendicular to the jointing planes and simultaneously applying vibration to said vibrating table parallel to the jointing planes in order to produce a weld of the two half-components by interpenetration and thus forming a one-piece component having monolithic characteristics,
    adjusting the length of the pressure-vibration phase in order to obtain a given depth of interpenetration,
    separating the two dies,
    extracting the one-piece component, and
    sintering the one-piece component so as to preserve the monolithic characteristics of the component.

2. Welding method according to claim 1, whereby the second half-component is positioned in a precise manner in relation to the first half-component at the end of the welding operation.

3. Welding method according to claim 1, whereby the joined monobloc component is allowed to cool before the working pressure is removed.

* * * * *